UNITED STATES PATENT OFFICE.

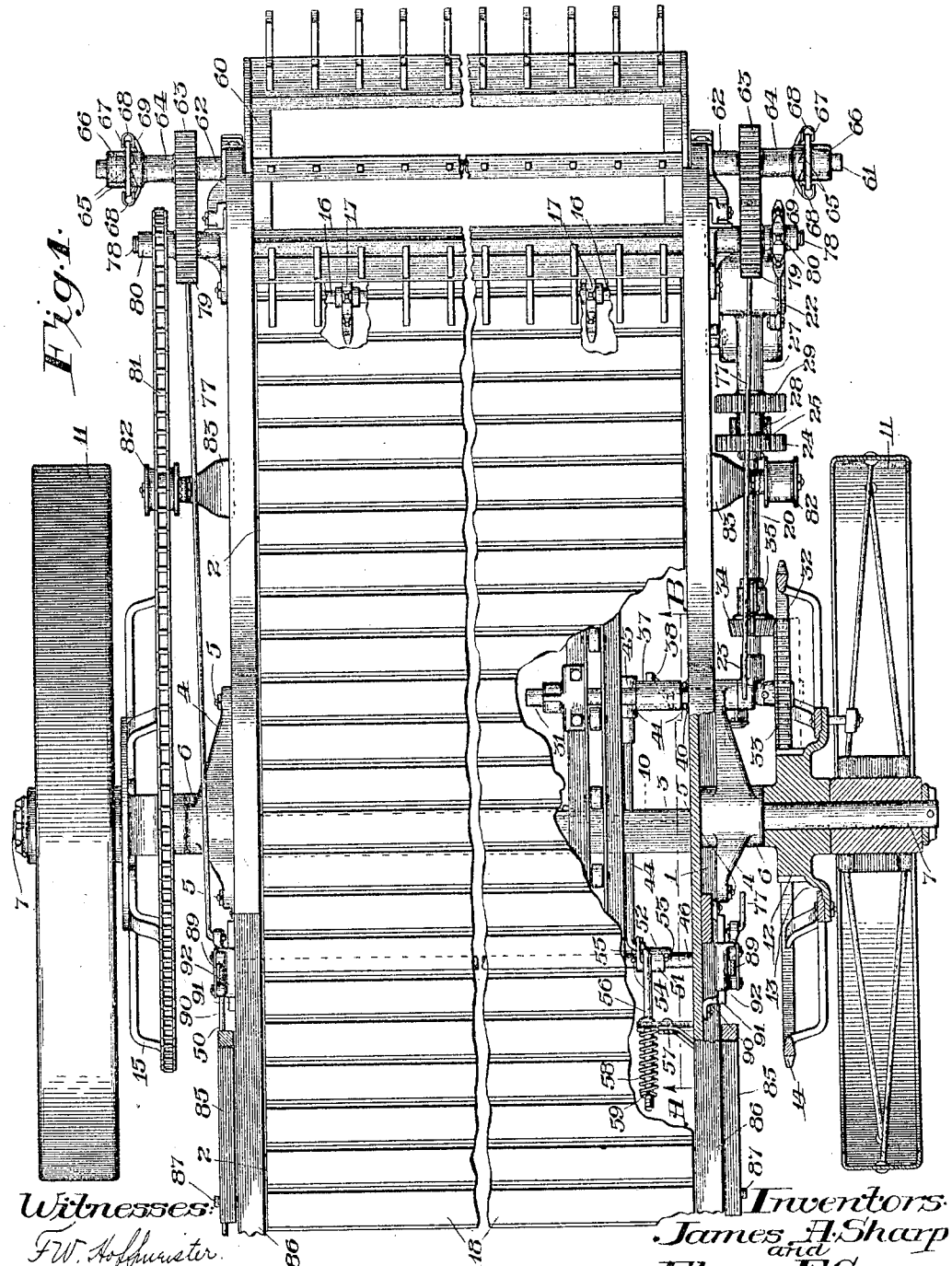

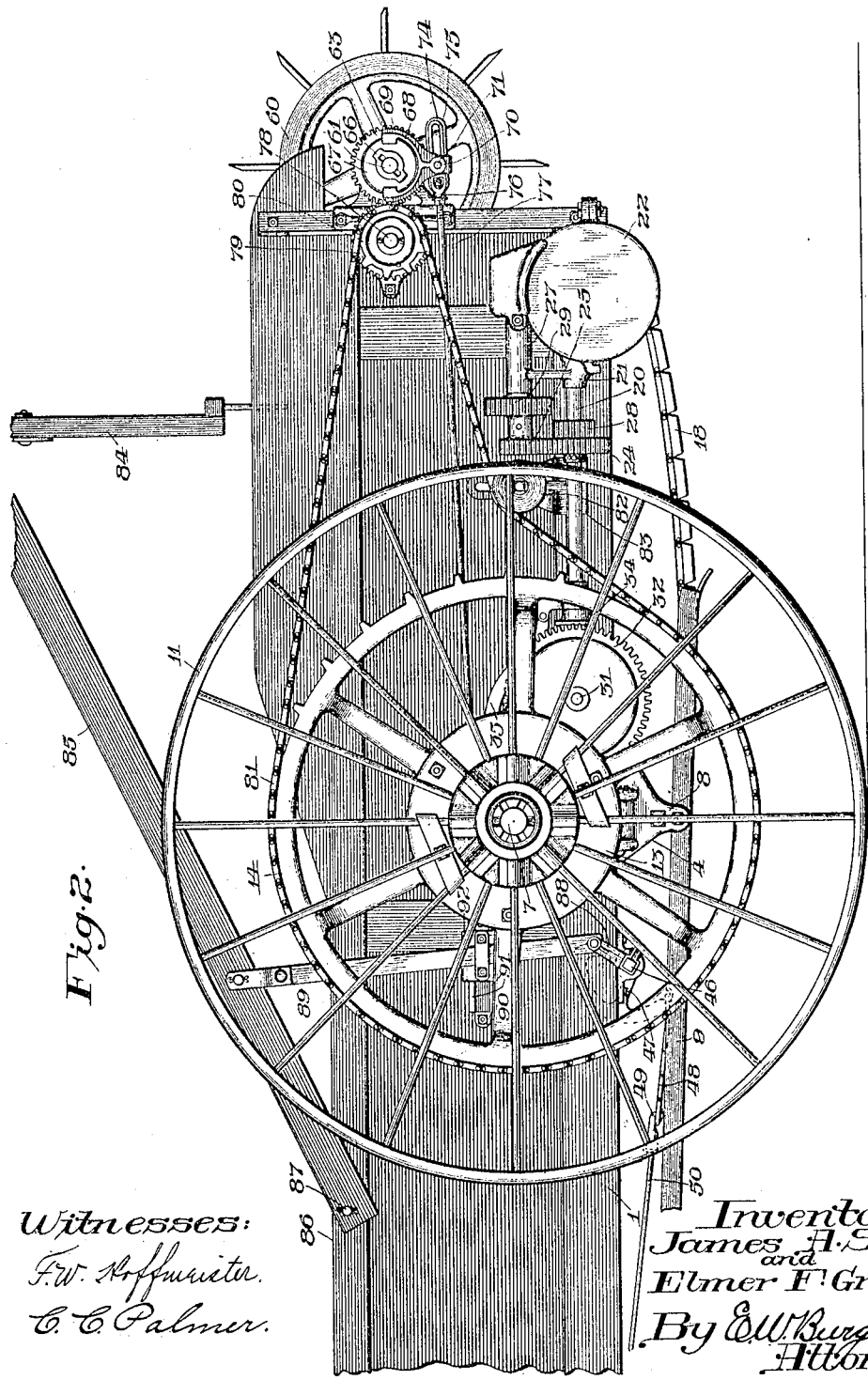

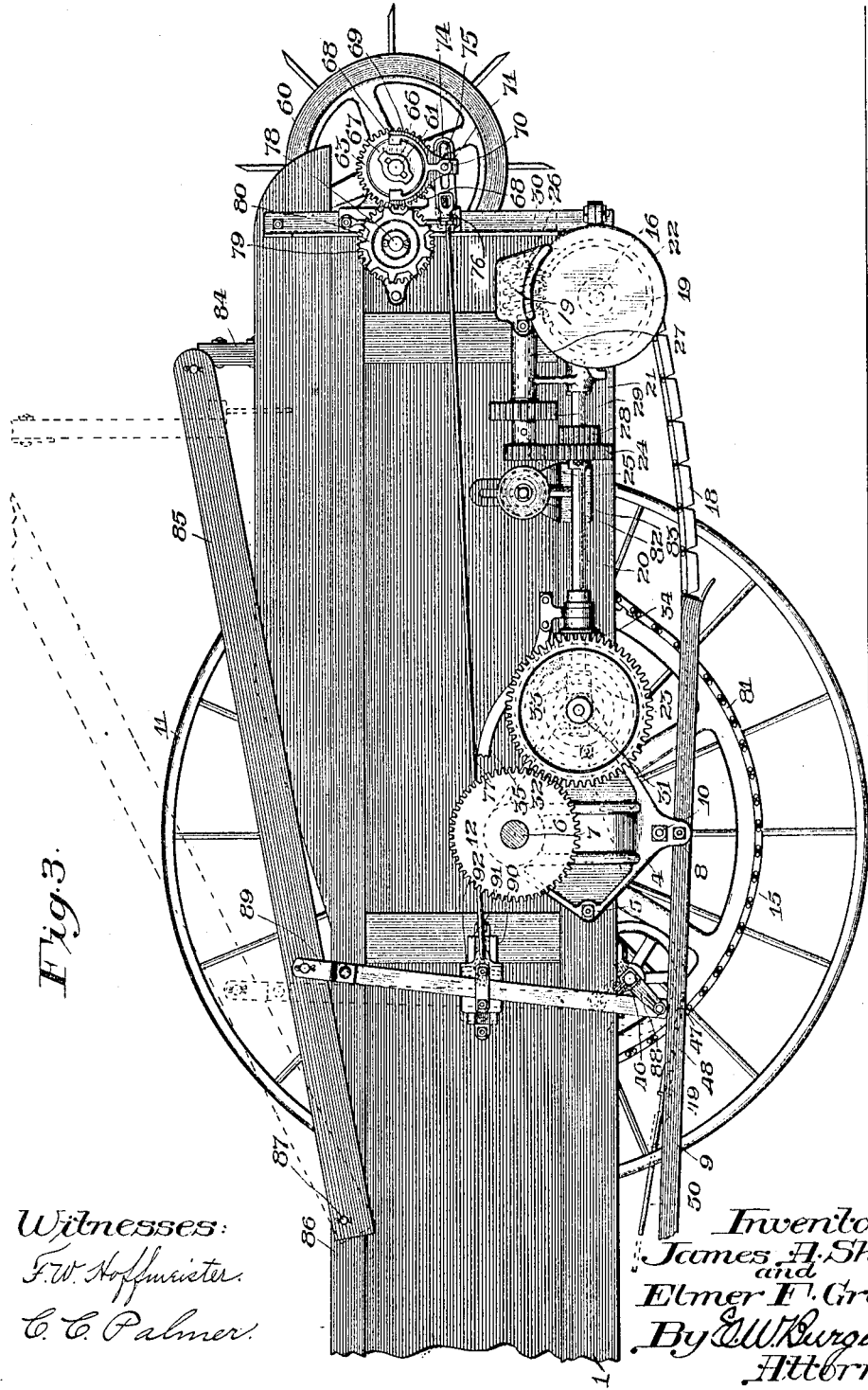

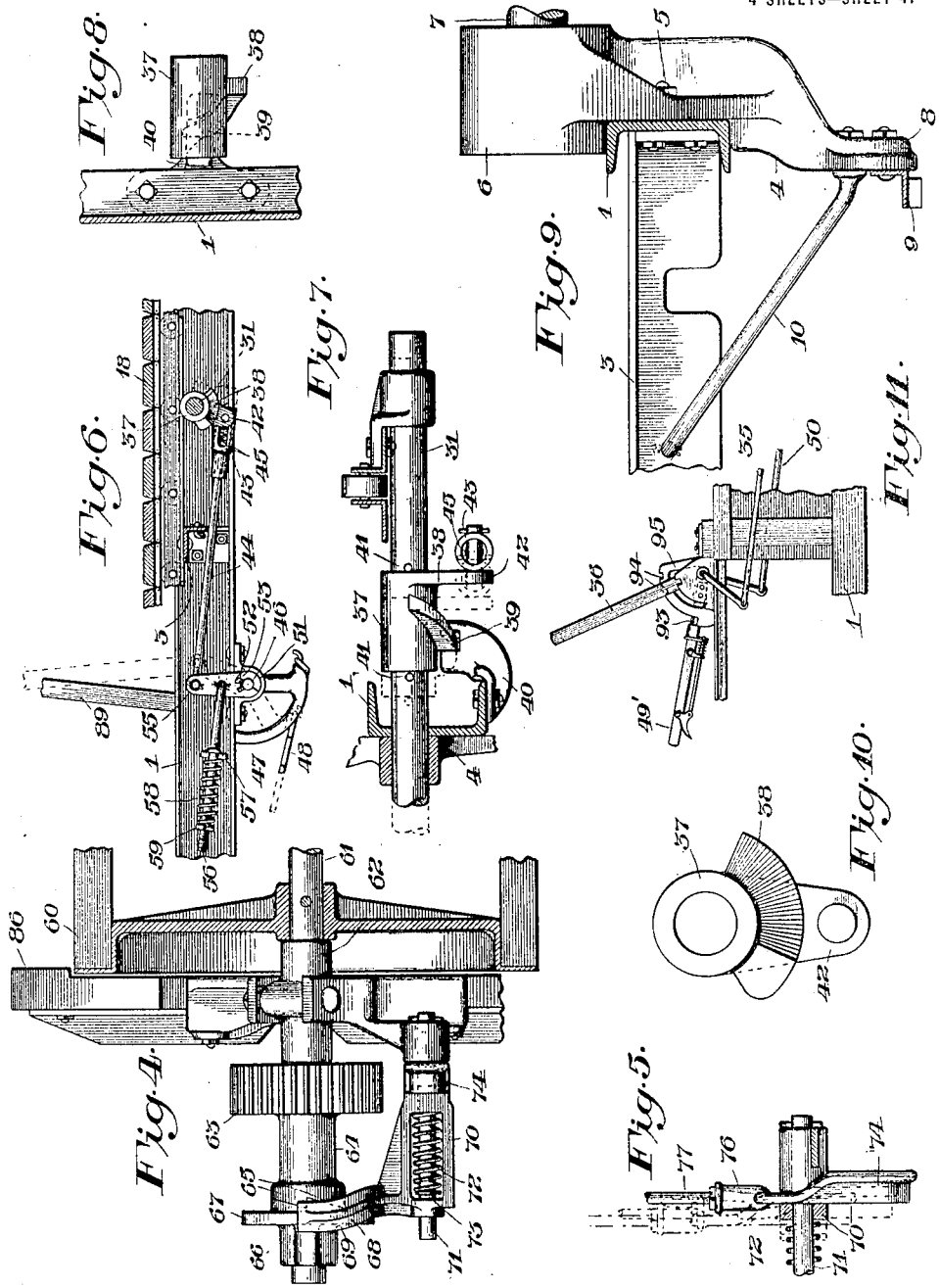

JAMES A. SHARP AND ELMER F. GROVE, OF SPRINGFIELD, OHIO, ASSIGNORS TO INTERNATIONAL HARVESTER COMPANY OF NEW JERSEY, A CORPORATION OF NEW JERSEY.

MANURE-SPREADER.

1,207,086.  Specification of Letters Patent.  Patented Dec. 5, 1916.

Application filed March 28, 1912. Serial No. 686,856.

*To all whom it may concern:*

Be it known that we, JAMES A. SHARP and ELMER F. GROVE, citizens of the United States, residing at Springfield, in the county of Clark and State of Ohio, have invented certain new and useful Improvements in Manure-Spreaders, of which the following is a specification.

Our invention relates to manure spreaders of the class having a receptacle mounted upon carrying and traction wheels, a distributing cylinder rotatably mounted at the rear end thereof, a movable bottom therein adapted to advance the material toward the distributing cylinder, and a rising and falling end-gate in front of said cylinder; the object of our invention being to provide improved means for transmitting power from the traction wheels to the distributing cylinder and to the movable bottom, improved clutch mechanism connected to the power transmitting means, and improved clutch shipping means connected with the end-gate controlling means and the gear shipping means. We attain these objects by means of the mechanism illustrated by the accompanying drawings, in which—

Figure 1 represents a top plan view of the rear part of a manure spreader having our invention forming a part thereof; Fig. 2 represents a side elevation of Fig. 1; Fig. 3 is a view similar to Fig. 2 and having one of the traction wheels removed; Fig. 4 is a detached detail designed to illustrate the operation of the clutch shipping mechanism forming part of the power transmitting means connected with the distributing cylinder; Fig. 5 is a detached detail of part of Fig. 4 designed to illustrate the construction of a slidable wedge forming part of the clutch shipping mechanism; Fig. 6 represents a part of Fig. 1 along line A—B and designed to illustrate part of the gear shipping mechanism connected with the power transmitting means between the traction wheel and the movable apron; Fig. 7 represents a side elevation of one of the shafts forming part of the mechanism shown in Fig. 6 and designed to illustrate the means whereby a longitudinal movement thereof may be effected; Fig. 8 is a plan view of part of Fig. 7; Fig. 9 is a detached detail, partly in section, drawn on an enlarged scale, and designed to illustrate the construction of a part of the base frame of the machine; Fig. 10 is a side elevation of the cam forming part of the gear shipping mechanism as illustrated in Figs. 6 and 7; and Fig. 11 represents the manner of mounting the hand levers whereby the operator may control the clutch and gear shipping mechanism from the front of the machine.

The same reference characters designate like parts throughout the several views.

The bed frame of the machine includes longitudinally arranged main sill members 1 at opposite sides thereof, preferably of channel bar form, a series of transverse members 2, of wood, having opposite ends thereof secured to the side sill members, and a supplemental transverse member 3 formed of angle steel, having one web thereof turned laterally at opposite ends thereof whereby said member is secured to the side sill members.

4 represents bracket members secured to the side sill members by means of bolts 5, having sleeve portions 6 that receive the stub axles 7 and depending legs 8, to which are secured the apron guides 9 and one end of brace members 10, the opposite ends of the brace members being turned laterally and received by openings in the vertical web of the transverse member 3. The traction wheels 11 are rotatably mounted upon the stub axles 7, and 12 represents a spur gear member secured to the traction wheel upon the left-hand side of the machine and provided with an annular flange 13, to which is secured a sprocket wheel 14, and 15 represents a sprocket wheel secured to the traction wheel upon the right-hand side of the machine.

16 represents a transversely arranged shaft journaled in bearings carried by the rear end of the bed frame and having secured thereto sprocket wheels 17 that engage with the endless apron 18 that forms the movable bottom of the receptacle in a manner to transmit motion thereto. Motion is imparted to shaft 16 by means of a worm wheel 19 secured to one end thereof.

20 represents a longitudinally arranged countershaft having the rear end thereof journaled in a bearing 21 forming part of a bracket member 22 secured to the rear end of the frame of the machine, the front end of said shaft being journaled in a bearing 23 connected with one of the bracket members 4.

24 represents a pinion having a relatively large diameter that is adjustable longitudinally upon the countershaft 20 and adapted to engage with a pinion 25 having a smaller diameter and secured to the rear end of a shaft 26 journaled in a bearing 27 integral with the bracket member 22. Integral with pinion 24 is a pinion 28 having a smaller diameter and adapted to engage with a relatively large pinion 29 that is preferably integral with pinion 25 that is secured to shaft 26. The pinions 24 and 28 are movable upon the shaft 20 in a manner whereby 24 may drive the shaft 26 through the small pinion 25 at a relatively fast speed, and if they are adjusted along the shaft so that pinion 28 engages with pinion 29, and pinions 24 and 25 are disengaged, shaft 26 will rotate at a slower speed. Secured to the rear end of shaft 26 is a worm gear 30 that engages with the worm wheel 19.

31 represents a transversely arranged countershaft journaled in bearings carried by the bed frame of the machine and adapted to slide longitudinally therethrough, and upon the outside end of the shaft is secured a gear wheel 32 that engages with the gear wheel 12, and provided upon its inner face with a series of concentric lines of teeth 33 that may selectively engage with a pinion 34 slidably mounted upon the longitudinally arranged shaft 20, the position of the pinion upon the shaft being controlled by the operator by means of a rod 35 that may be operatively connected with a hand lever 36 at the front of the machine. A longitudinal movement of the shaft 31 causes the gear wheel 32 to move toward or from the pinion 34 in a manner to engage with or be disengaged therefrom, and such movement is effected by means of a sleeve 37 that is rotatably mounted upon the shaft 31 and provided with a spirally arranged rib 38 thereon that is received by a notch 39 in a bracket member 40 secured to the side sill member of the bed frame of the machine. The sleeve is prevented from longitudinal movement along the shaft by means of pins 41 passing through the shaft and engaging opposite ends of the sleeve. Integral with the sleeve is a lever arm 42 having a laterally arranged stud thereon to which is pivotally connected the rear end of a yoke member 43 that slidably receives the rear end of a link 44, and 45 represents a spring surrounding the link and inclosed by the yoke in a manner forming a yielding connection between the yoke and link in a well-known way.

46 represents a rock shaft journaled transversely upon the bed frame in front of the axis of the traction wheels, having a sector 47 secured to one end thereof and upon the right-hand side of the machine, and 48 represents a flexible connection between the hook 49 at the rear end of a link 50 and sector 47, the front end of the link being adapted to be connected to a hand lever $49^1$ at the front of the machine whereby the operator may control a rocking movement of the shaft.

51 represents a sleeve loosely journaled upon rock shaft 46 in a manner permitting a limited rocking movement of the sleeve thereon in one direction independent of said shaft, the means permitting such movement including a pin 52 received by an opening in the shaft and extending within the path of movement of a laterally projecting ear member 53 upon one end of the sleeve, the sleeve being prevented from moving endwise in an opposite direction by means of a pin 54 through the shaft at the opposite end of the sleeve. The sleeve is provided with a radially projecting arm 55 having lateral openings therein, one of the openings receiving the hook-shaped portion of the front end of link 44, and the other the rear hook-shaped end of a link 56, the body of said link being slidably received by an opening in a bracket member 57 secured to the bed frame of the machine, and 58 represents a compression spring encircling the front end of the link and operative between the front side of the bracket and an adjusting nut 59 in a manner to yieldingly resist a rocking movement of shaft 46 in one direction.

60 represents a distributing cylinder having the central shaft 61 thereof journaled in bearings 62 carried by the rear end of the receptacle. Power is transmitted to the cylinder by means including spur pinions 63 loosely journaled upon the shaft 61 at opposite ends thereof and provided with sleeve portions 64 that terminate in enlarged cylindrical portions provided with clutch teeth 65 upon the outside ends thereof, that are adapted to engage with toothed clutch members 66 that are slidably mounted upon said shaft and adapted to transmit movement thereto when engaged with the clutch teeth upon the sleeves. Members 66 are provided with circular flanges 67 that are received by annular channels upon oppositely disposed arms 68 of clutch shipping fork members 69 that are provided with sleeve portions 70 arranged parallel with the axis of shaft 61 and slidably mounted upon studs 71 secured to a fixed part of the structure.

72 represents coiled compression springs encircling the studs and received by a chamber in the sleeve portions and operative between pins 73 through the studs near the outside ends thereof and the opposite ends of the chambers in a manner to normally cause the clutch members 66 to engage with the loose clutch members.

74 represents wedge-shaped members having longitudinally arranged slots 75 therein that receive the studs 71, and threaded socket members 76 at the front ends that receive the rear ends of rods 77 whereby the wedge members move longitudinally. The wedge members are operative between a fixed part of the structure and the inner ends of the sleeve portions of the clutch shipping fork in a manner to cause the latter to move against the force of spring 72 and disengage the clutch members when said wedge members are drawn forward, and to permit them to reëngage when moved in an opposite direction.

78 represents stub shafts carried by the frame of the machine, upon opposite sides thereof, 79 and 80 combined pinions and sprocket wheels journaled upon said studs, the pinions engaging with pinions 63 and the sprocket wheels connected with the main sprocket wheels secured to the traction wheels by means of sprocket chains 81; and 82 represents adjustable chain tighteners mounted upon bracket members 83 secured to the base frame of the machine and engaging with the lower lead of the chain.

84 represents a common form of end-gate having opposite ends thereof pivotally connected at its upper side with the rear ends of arms 85, the front ends of said arms being pivotally connected to the upper rails 86 of the receptacle by means of pins 87. Means are provided for raising and lowering the rear ends of the arms and end-gate, said means including lever arms 88 secured to opposite ends of rock shaft 46; and 89 represents bars connecting the lever arms with the arms 85 in rear of the pivotal connection thereof with the receptacle in a manner whereby the arms 85 are raised or lowered when the shaft 46 is rocked in opposite directions. When the end-gate is raised from a position in front of the distributing cylinder to its elevated position, the clutch mechanism connected with the power transmitting gearing that actuates the cylinder is simultaneously tripped into operation by means including bracket members 90 secured to opposite sides of the receptacle and provided with longitudinally arranged ways 91 upon which are slidably mounted blocks 92 having vertically arranged slots therein that receive the middle portions of the bars 89 in a slidable manner. The rear ends of the blocks 92 are connected with the front ends of the rods 77, and when the shaft 46 is rocked in a direction to raise the end-gate the blocks 92 are caused to slide rearward and, through the connecting rods 77, push the wedge members 74 in a direction permitting the clutch members 65 and 66 to engage, and motion is thereby transmitted to the distributing cylinder. Simultaneously with the raising of the end-gate motion is transmitted to the endless apron through a longitudinal movement of shaft 31 caused by its connection with shaft 46 through the sleeve 37 and the spirally arranged rib 38 thereof that engages with the notch in the bracket 40 in a manner to move the shaft longitudinally and cause the gear 32 to engage with pinion 34, and when the end-gate is lowered the parts move in an opposite direction and the gears are disengaged.

The hand lever 49¹ is provided with a common form of detent mechanism 93 that is adapted to retain the lever in various positions of adjustment by engaging with notches 94 in a sector 95. If the lever be moved rearward sufficient to permit the detent to engage with the front one of the two notches 94 in the sector, the end-gate will be raised and the clutch mechanism connected with the distributing cylinder tripped into action and the cylinder rotated thereby; but such movement of the lever will not cause the gear wheel 32 to engage with pinion 34, due to loose motion between shaft 46 and sleeve 51 thus permitting the cylinder to gain speed in advance of any feeding operations of the endless apron, and when the lever is moved rearward, permitting the detent to engage with the rear notch of the sector, the gear wheel 32 engages the pinion 34 and the feeding operation of the endless apron begins.

What we claim as being our invention, and desire to secure by Letters Patent, is:

1. In a manure spreader, a frame, a distributing cylinder mounted at one end thereof, means for rotating the same, clutch mechanism carried at the ends of said cylinder and controlling the connection thereof, an end-gate pivotally connected to said frame, links pivotally connected thereto at points at one side of the pivots and protruding downward on opposite sides of the frame, means for moving said links in an up and down direction, and means transmitting the lateral movement of said links directly to said clutch mechanism.

2. In a manure spreader, a frame, transport wheels therefor, a distributing cylinder carried at one end thereof, an end-gate pivotally connected to said frame, a rock shaft disposed transversely of said frame, links pivotally connecting the same to said end-gate, means for rotating said cylinder, a clutch controlling the connection thereof to said cylinder, and a longitudinally disposed link connection intermediate said links and said controlling means transmitting the movement of said links to said controlling means.

3. In a manure spreader, a frame, a distributing cylinder rotatably mounted at the rear thereof, means for rotating the same, clutch mechanism controlling the connection thereof to said cylinder, an end-gate movable with respect to said cylinder, a transverse rock shaft extending beneath said frame link connections extending on opposite sides of said frame connecting said shaft to said end-gate, means for rocking said shaft, and clutch actuating connections attached to said clutch mechanism and said links intermediate the ends thereof and movable longitudinally of said frame to actuate said clutch mechanism upon movement of said end-gate.

4. A manure spreader having, in combination, supporting stub axles, traction wheels journaled upon said axles, a receptacle carried by said axles, a distributing cylinder rotatably mounted at the rear end of said receptacle, power transmitting means connecting said cylinder with said traction wheels, said means including clutch mechanisms, an end-gate, means for raising and lowering said end-gate, said means including supporting arms pivotally connected with said receptacle, a transversely arranged rock shaft journaled upon said receptacle, lever arms secured to opposite ends thereof, links connecting said lever arms with said end-gate supporting arms, and means for shipping said clutch mechanisms into and out of engagement with said cylinder, said means being controlled by a swinging movement of said links.

5. A manure spreader having, in combination, supporting stub axles, traction wheels journaled upon said axles, a receptacle carried by said axles, a distributing cylinder rotatably mounted at the rear end of said receptacle, power transmitting means connecting said cylinder with said traction wheels, said means including clutch mechanism, an end-gate, means for raising and lowering said end-gate, said means including supporting arms having the front ends thereof pivotally connected with the side walls of said receptacle, a transversely arranged rock shaft journaled in bearings carried by said receptacle, means for rocking said shaft, lever arms secured to opposite ends of said rock shaft, links connecting said lever arms with said end-gate supporting arms, means for shipping said clutch mechanism into and out of engagement with said cylinder, said means including blocks slidably mounted upon the side walls of said receptacle, said blocks engaging with said links in a slidable manner and having a connection with said clutch shipping mechanism whereby a swinging movement of said links controls the operation of said clutch shipping means.

6. A manure spreader having, in combination, supporting stub axles, traction wheels journaled upon said axles, a receptacle carried by said axles, a distributing cylinder including a central shaft journaled in bearings carried by the rear end of said receptacle, means for transmitting motion from said traction wheels to said cylinder, said means including fixed and sliding clutch members mounted upon opposite ends of said central shaft, means for controlling the movement of said sliding clutch members, said means including clutch shipping forks and sliding wedges adapted to control the movement thereof, an end-gate, means for raising and lowering said end-gate, said means including supporting arms having the front ends thereof pivotally connected with the side walls of said receptacle, a transversely arranged rock shaft journaled in bearings carried by said receptacle, and means for rocking said shaft, lever arms secured to opposite ends of said shaft, links connecting said lever arms with said end-gate supporting arms, blocks slidably mounted upon the side walls of said receptacle, said blocks engaging with said links in a slidable manner, and link connections between said blocks and said sliding clutch shipping wedges.

7. In a manure spreader, the combination of a receptacle, stub axles secured to the sides thereof, traction wheels carried on said axles, a distributing cylinder, a movable bottom in said receptacle, power transmitting means connected with said cylinder and with each of the traction wheels, power transmitting means for said movable bottom connected with one of said traction wheels, a clutch device in each of said power transmitting means, an end-gate movable in a vertical direction to occupy a position in front of the distributing cylinder or above said cylinder, and connecting means whereby said clutch devices are shifted to throw successively the distributing cylinder and movable bottom into operation when said end-gate is elevated and out of operation when said end-gate is lowered.

J. A. SHARP.
ELMER F. GROVE.

Witnesses:
W. B. KENDIG,
GEO. A. SMITH.

Copies of this patent may be obtained for five cents each, by addressing the "Commissioner of Patents, Washington, D. C."